June 25, 1929.  C. T. HATCH  1,718,418
POWDERING MACHINE
Filed March 25, 1927   3 Sheets-Sheet 1

INVENTOR
Charles T. Hatch
BY
Chappell Earl
ATTORNEYS

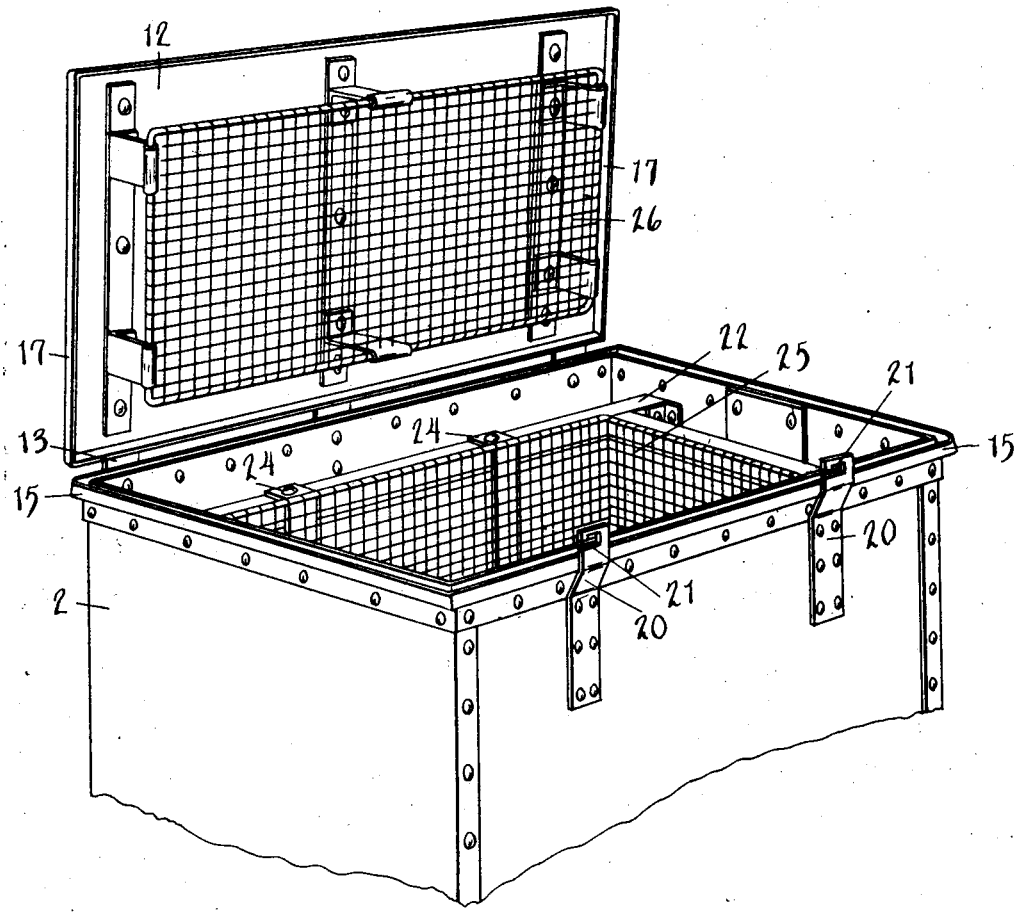
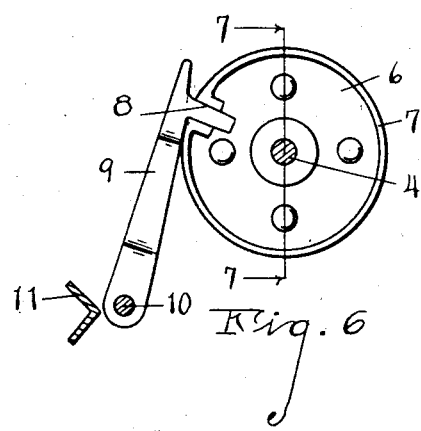
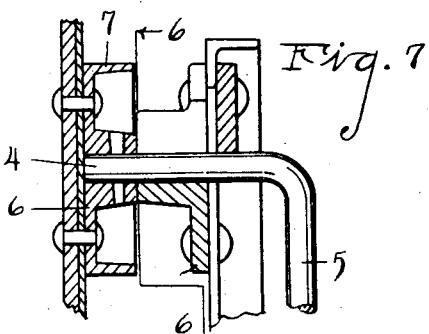

INVENTOR
Charles T. Hatch
BY Chappell & Earl
ATTORNEYS

Patented June 25, 1929.

1,718,418

UNITED STATES PATENT OFFICE.

CHARLES T. HATCH, OF ALBION, MICHIGAN, ASSIGNOR TO UNION STEEL PRODUCTS COMPANY, OF ALBION, MICHIGAN.

POWDERING MACHINE.

Application filed March 25, 1927. Serial No. 178,258.

The main object of this invention is to provide a powdering machine for doughnuts and the like which is of large capacity, easy to operate and not likely to injure the doughnut or like product treated.

A further object is to provide a structure embodying these advantages which is comparatively simple and economical in structure.

Objects pertaining to details and economies of my invention will appear from the description to follow. The invention is defined and pointed out in the claims.

A structure embodying the features of my invention is clearly illustrated in the accompanying drawing forming a part of this application, in which:

Fig. 3 is a fragmentary perspective view of a tumbling barrel or receptacle removed from the frame with the cover open, the foraminate basket or container being shown in its support within the receptacle.

Fig. 6 is a detail section on line 6—6 of Figs. 1 and 7 showing details of the tumbling receptacle mounting and the holding dog therefor.

Fig. 7 is a fragmentary view partially in section on a line corresponding to line 7—7 of Figs. 2 and 6.

Figure 2:
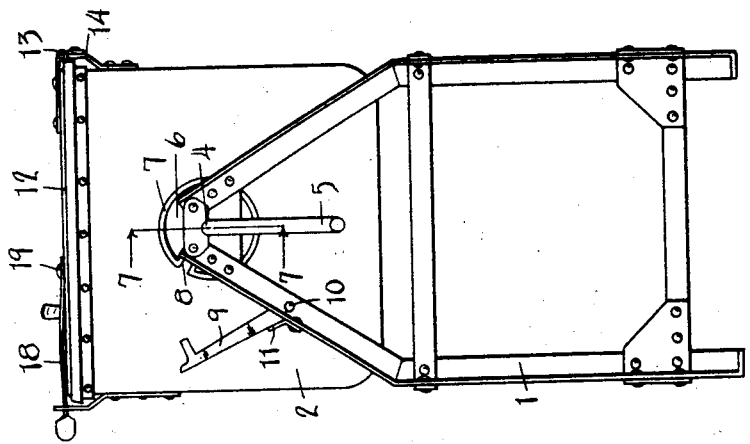
Fig. 2 is an end elevation looking from the right of Fig. 1.
Figure 1:
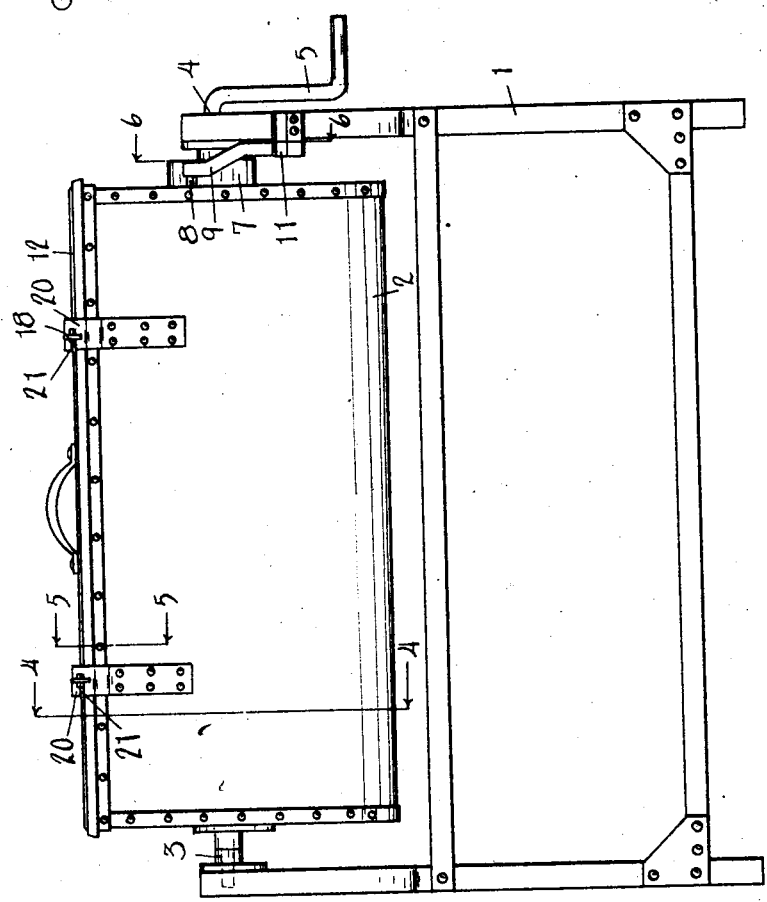
Fig. 1 is a side elevation of a powdering machine embodying the features of my invention.
Figure 4:
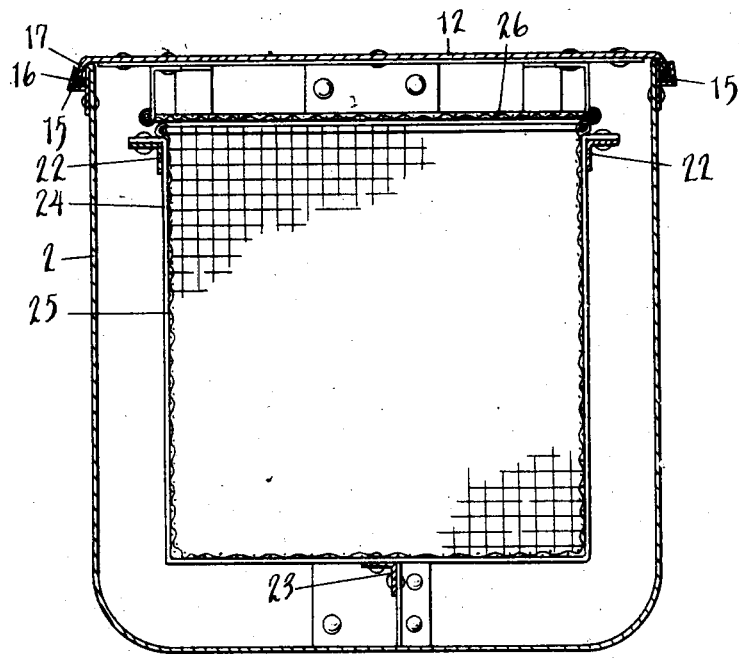
Fig. 4 is a vertical cross section through the tumbling barrel or receptacle and container on line 4—4 of Fig. 1.

Referring to the drawing, I provide a frame designated generally by the numeral 1 which is built up of angle iron to support the operating parts. The tumbling barrel or receptacle 2 is made up in the form of a box and has journals 3 and 4 at its ends mounted in suitable bearings on the frame, the journal 4 terminating in a crank 5.

The hub 6 by which the journal 4 is attached to the receptacle is provided with a flange-like rim 7 having a recess 8 therein with which the locking dog 9 may be engaged for holding the receptacle in upright position. This dog is pivoted at 10 and a rest 11 is provided to support the dog when disengaged from the receptacle 8. The purpose of this is to securely hold the receptacle so that the loaded containers can be easily introduced into and removed from the receptacle.

Figure 5:
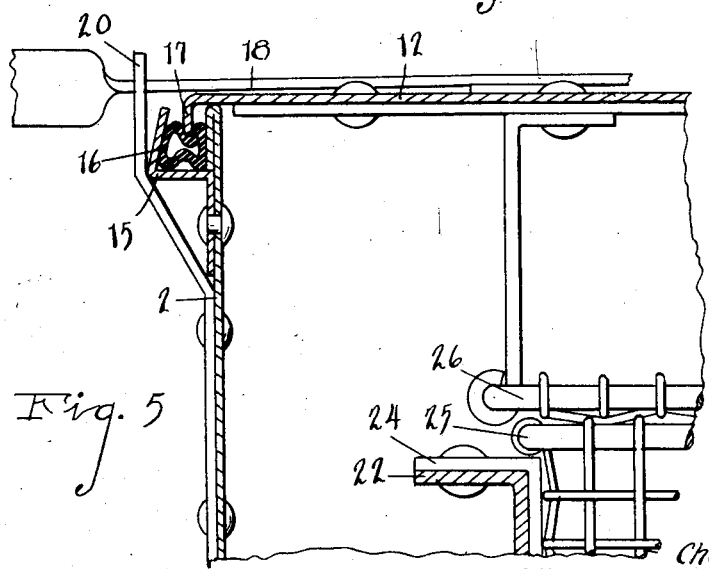
Fig. 5 is an enlarged detail view partially in section on line 5—5 of Fig. 1.

The receptacle 2 is provided with a cover 12 which is pivoted at 13 on the bracket-like hinge members 14 projecting upwardly at the rear side of the receptacle. The receptacle is provided with an upwardly facing gasket supporting channel 15 containing a rubber tubular gasket 16 against which the downwardly projecting flanges 17 of the cover close as is shown in Fig. 5. The cover is held in closed position under spring tension by means of the latches 18 which are formed of spring material, the latches being pivoted to the cover at 19 to swing in a horizontal plane relative to the cover into engagement with the upwardly projecting keepers 20 on the receptacle. These keepers 20 have notches 21 therein with which the latches are engaged under spring tension so that the cover is held firmly against the gasket.

Within the receptacle in spaced relation to its walls I mount longitudinal support members 22, 23 which carry stirrup-like holders 24 for the wire basket or foraminous container 25. The basket or container 25 is supported in this holder for free removal when the cover 12 is open.

On the cover 12 I mount a foraminous cover 26 for the container which is supported in spaced relation to the cover 12 so that when the cover 12 is closed the container is closed and clamped in position in the holder by the cover 26. The foraminous container is thus supported in spaced relation to all of the walls of the tumbling receptacle so that powdered sugar or like material may pass freely around the container and discharge into and through the container as the tumbling receptacle is rotated.

In practice I provide a plurality of the containers so that one container may be charged with the articles to be treated, another emptied while a third is within the tumbling barrel.

My improved powdering machine is very simple and economical in structure and at the same time is of large capacity. The machine effectively handles doughnuts or the like without injury thereto and may be used by an unskilled person.

Having thus described my invention what

I claim as new and desire to secure by Letters Patent is:

1. In a structure of the class described, the combination of a supporting frame, a box-like tumbling receptacle journaled in said frame and provided with a crank, said tumbling receptacle having an upwardly facing gasket channel at the top of its side walls, a gasket arranged in said channel, a cover for said tumbling receptacle having downwardly projecting flanges at the edges thereof closing against said gasket, a container holder within said receptacle adapted to removably support a container with its walls in substantially spaced relation to the walls of the receptacle, a foraminous container removably supported in said holder, and a foraminous cover for said container mounted on said receptacle cover in substantially spaced relation thereto to close against the container and clamp it in said holder when the receptacle cover is closed.

2. In a structure of the class described, the combination of a rotatably mounted tumbling receptacle, a cover for said receptacle, a foraminous container, a support within said receptacle adapted to receive said container and support the same with its walls in substantially spaced relation to the walls of the receptacle, and a foraminous cover for said container mounted on said receptacle cover in substantially spaced relation thereto to close said container and retaining it in its holder when the receptacle cover is closed, the container being freely removable when the receptacle cover is open.

3. In a structure of the class described, the combination of a rotatably mounted tumbling receptacle, a cover for said receptacle, a foraminous container, a support within said receptacle adapted to receive said container and support the same with its walls in substantially spaced relation to the walls of the receptacle, and a foraminous cover for said container mounted on said receptacle cover in substantially spaced relation thereto to close said container when the receptacle cover is closed.

In witness whereof I have hereunto set my hand.

CHARLES T. HATCH.